United States Patent
Satterthwaite et al.

[15] 3,695,637
[45] Oct. 3, 1972

[54] INFLATABLE COUPLING

[72] Inventors: James Glenn Satterthwaite, 5011 Dogwood Trail, Portsmouth, Va. 23703; James B. Macy, Jr., 107 River Drive, Morehead City, N.C. 28557

[22] Filed: May 6, 1970

[21] Appl. No.: 35,164

[52] U.S. Cl. .....................285/97, 285/229, 285/286
[51] Int. Cl. ...............................................F16l 17/00
[58] Field of Search .......285/96, 97, 229, 286; 279/4

[56] References Cited

UNITED STATES PATENTS

| | | | |
|---|---|---|---|
| 3,420,554 | 1/1969 | Stroub | 285/97 |
| 3,594,023 | 7/1971 | Yano | 285/337 |
| 3,023,995 | 3/1962 | Hopkins | 285/97 X |
| 3,222,076 | 12/1965 | Hollingsworth | 285/97 X |
| 3,486,772 | 12/1969 | Elsner | 285/96 |

FOREIGN PATENTS OR APPLICATIONS

| | | | |
|---|---|---|---|
| 556,010 | 9/1943 | Great Britain | 285/97 |
| 1,491,334 | 7/1967 | France | 285/97 |
| 459,687 | 9/1968 | Switzerland | 285/97 |

*Primary Examiner*—Dave W. Arola
*Attorney*—McNenny, Farrington, Pearne and Gordon

[57] ABSTRACT

An inflatable coupling for connecting adjacent members is disclosed. Such coupling may be used to releasably connect pipes or the like providing a fluid tight connection therebetween. When required, the coupling can accommodate swiveling movement or the like. The coupling may also be used to transmit torque between two adjacent members to serve as a brake, clutch or power drive connection. The coupling includes a closed loop gas-impervious body of elastomeric material providing a continuous chamber which is pressurized when coupling is required, and exhausted when release of the coupling is required. Flexible wall means assume a release position when the chamber is exhausted and move to a position for engagement with the associated members to be coupled when the chamber is pressurized.

10 Claims, 7 Drawing Figures

PATENTED OCT 3 1972
3,695,637
SHEET 1 OF 3
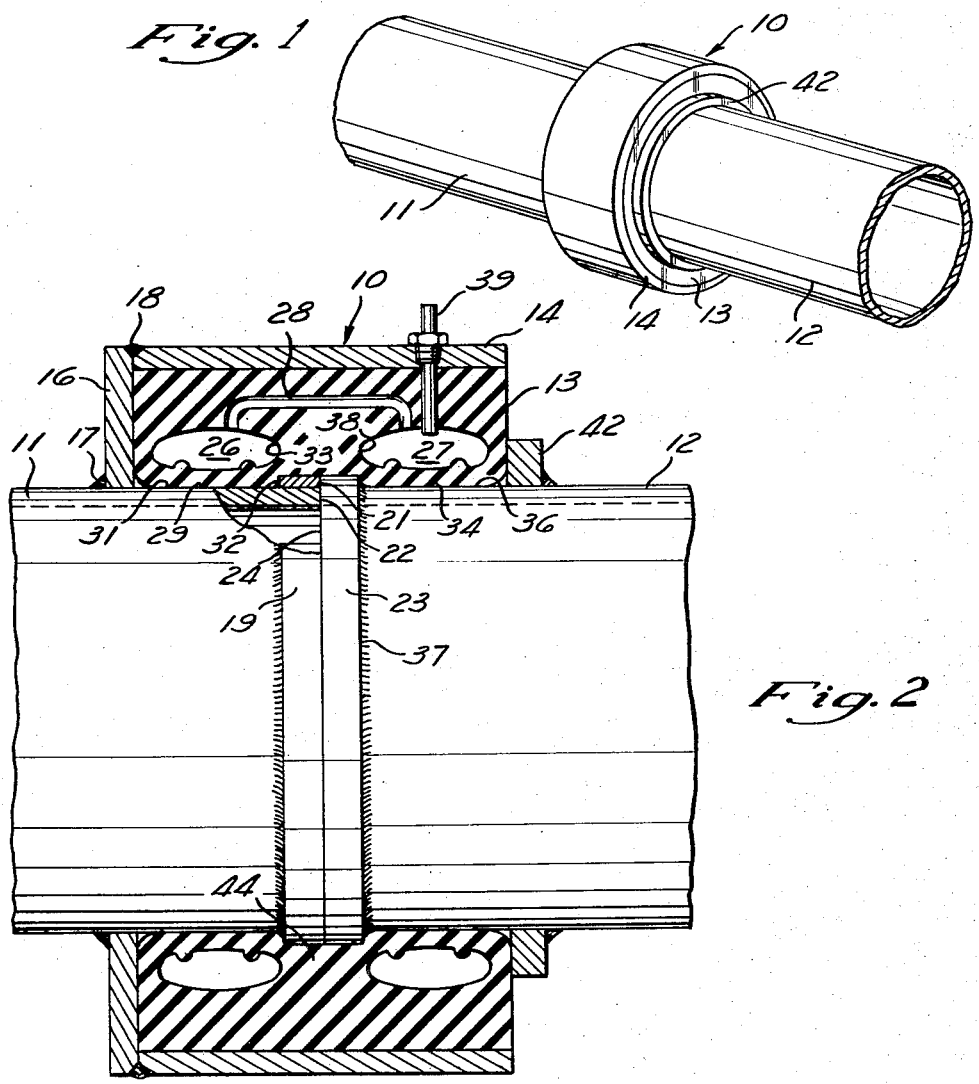
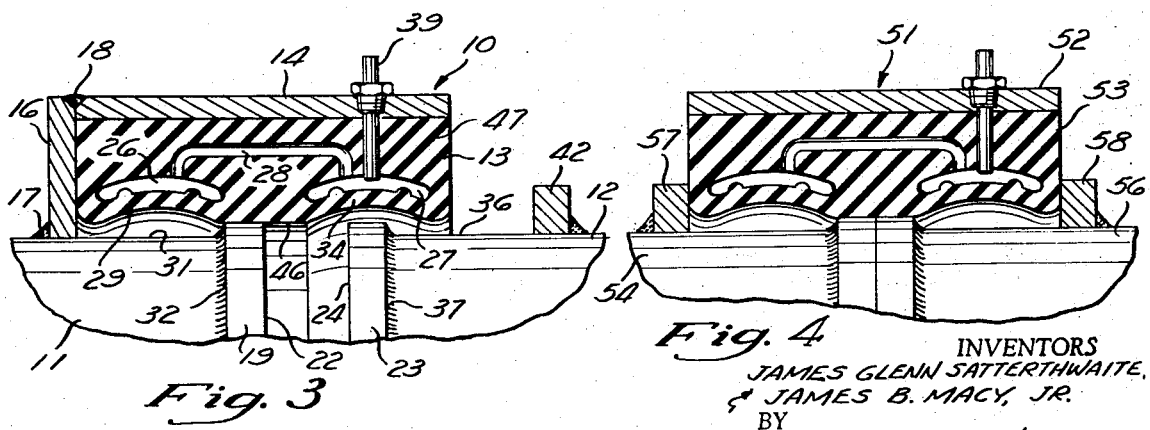
INVENTORS
JAMES GLENN SATTERTHWAITE,
& JAMES B. MACY, JR.
BY
McNENNY, FARRINGTON, PEARNE & GORDON
ATTORNEYS INVENTORS
JAMES GLENN SATTERTHWAITE,
& JAMES B. MACY, JR.
BY
McNENNY, FARRINGTON, PEARNE, & GORDON

ATTORNEYS

INFLATABLE COUPLING

BACKGROUND OF THE INVENTION

This invention relates generally to releasable couplings and more particularly, to a novel and improved inflatable coupling particularly suited for connecting adjacent ends of cylindrical members such as pipe, shafting and the like.

The present invention has several important aspects. In accordance with one aspect of this invention novel and improved means are provided to releasably connect the adjacent ends of two pipes providing a fluid tight connection therebetween and sufficient mechanical connection to prevent the pipes from blowing or being pulled apart. Two general types of couplings are disclosed which relate to this aspect of the invention. In one embodiment a relatively rigid connection is provided between the adjacent pipe ends which maintains the pipes in a predetermined position with respect to each other. In the other embodiment the coupling is arranged to accommodate swiveling movement between the pipes while still providing a mechanical and a fluid tight connection between the pipe ends. In accordance with another aspect of this invention a releasable coupling is provided which functions as a torque transmitting coupling to drivingly connect adjacent ends of rotating shafts or the like.

PRIOR ART

In many instances it is necessary to provide means to releasably connect two portions of a piping system. In the past various types of structures have been provided for this purpose. In small pipes it is customary in many instances to form threads on the two ends so that the pipes can be threaded together or into a coupling. In other instances, particularly where large diameter piping is involved, the pipe ends are usually provided with end flanges which are bolted together usually with an intermediate gasket to releasably connect the pipe ends. Such flange type connections are not particularly satisfactory for use where pipes must be repeatedly connected and disconnected since a clumsy structure is involved which is difficult to align and connect, and the gaskets are often damaged.

When a piping system must accommodate misalignment between adjacent pipes or relative movement between pipes such as swiveling movement, the structure utilized in the past has been even more complicated and difficult to use. An example of such a system is found in the discharge piping system of a hydraulic dredge which often is supported on floats. In such system swivel connections between adjacent pipe sections are used to accommodate movement between adjacent piping sections. Since such systems often involve a large number of pipe sections which must be temporarily joined together to carry the dredge discharge a substantial distance from the dredge to the desired discharge location, the labor and expense in such systems can be very substantial.

SUMMARY OF THE INVENTION

In accordance with the present invention an inflatable coupling is provided which is suitable for providing a mechanical connection between adjacent cylindrical members such as pipes or the like. When this invention is used to provide a coupling for pipes which carry fluid, the coupling is, in addition, arranged to provide a fluid tight joint between the adjacent pipe ends. The coupling utilizes a simple inflatable coupling member formed of elastomeric material or the like which, when deflated, permits easy insertion or removal of the pipe ends and, when inflated, provides the mechanical and sealing connection between the pipe ends. With such a coupling it is merely necessary to insert the ends of the pipe to be coupled into the inflatable coupling ring and pressurize the ring from any suitable source of air pressure or the like, such as a pressure bottle. Therefore, the substantial manual labor previously required in many coupling systems is eliminated. The coupling ring will remain inflated for substantial periods of time and when it is desired to disconnect the two pipe ends, it is merely necessary to deflate the coupling and remove the pipe ends therefrom.

In each of the illustrated embodiments the coupling includes a closed loop body of gas-impervious elastomeric material formed with continuous chamber means therearound. One side of the chamber means is defined by a movable wall which remains in a released position when the chamber means are not pressurized. In such a released position the coupling and adjacent members can be moved with respect to each other. However upon inflating the chamber means, the movable wall moves to a position in tight engagement with the associated pipe or the like with sufficient force to prevent relative movement between the pipe and the movable wall. When the coupling is subjected to axial loading tending to separate the members as is the case when the coupling is used to connect a piping system subjected to pressure, the pipe ends may be formed with radially extending surfaces against which the movable wall seats to augment its frictional resistance against axial loads between the pipe ends. When small to medium axial loading is applied to the coupling, such radially extending surfaces are not required.

BRIEF DESCRIPTION OF THE DRAWINGS

FIG. 1 is a fragmentary perspective view of two pipes connected by a coupling assembly in accordance with the present invention;

FIG. 2 is an enlarged longitudinal secton of the coupling illustrated in FIG. 1 illustrating the coupling in the inflated and coupled condition;

FIG. 3 is a fragmentary section of the coupling of FIG. 1 illustrating the coupling in the deflated condition and with the coupling partially disassembled;

FIG. 4 is a fragmentary section of a modified form of the coupling illustrated in FIGS. 2 and 3 wherein the coupling ring is not permanently connected to either pipe section;

FIGS. 1 through 3 illustrate a first embodiment of this invention in which a coupling assembly 10 connects the adjacent ends of two pieces of pipe 11 and 12. In this embodiment the coupling assembly provides both mechanical and sealing connection between the two pipes or torque tubes. Referring to FIG. 2, the coupling assembly 10 includes a closed loop body 13 formed of a gas-impervious elastomeric material which is radially confined within a metal rim 14. Preferably, the elastomeric body 13 is bonded to the rim 14 to provide a permanent assembly.

Figure 5:
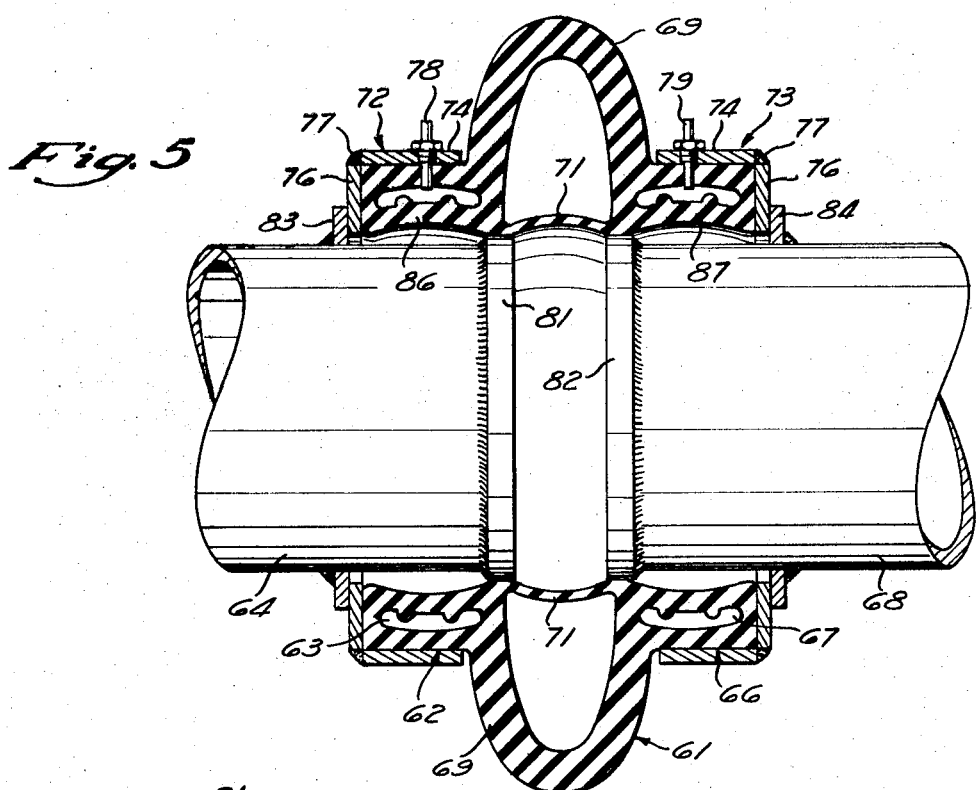
FIG. 5 is a longitudinal section of a coupling assembly arranged to accommodate swiveling movement between adjacent pipe ends illustrating the coupling before it is inflated.

The rim 14 is supported on the pipe 11 by a racial end connector 16 which is welded at 17 to the exterior surface of the pipe and at 18 to the end of the rim 14. The end connector 16 may be formed as an annular member extending completely around the pipe. Alternately, the connector 16 can be provided by two or more radially extending straps since the connector 16 is not subjected to any material force and functions primarily to maintain the body 13 and rim 14 in the correct position with respect to the end of the pipe 11.

A shallow flange 19 is provided by a ring 21 welded to the pipe 11 adjacent to its end 22. A similar flange 23 is provided on the pipe 12 adjacent to its end 24.

The body 13 is formed with two continuous chambers 26 and 27 which are similar in shape. A passage 28 formed in the body 13 provides a fluid connection between the two chambers 26 and 27. The inner wall 29 of the chamber 26 is caused to tightly engage the adjacent cylindrical surface 31 and the radially extending wall 32 of the pipe 11 when the chamber 26 is pressurized. Preferably, the chamber 26 is formed so that the side 33 is substantially radially aligned with the wall 32.

The inner wall 34 of the chamber 27 is caused to similarly tightly engage the adjacent cylindrical surface 36 and the radially extending wall 37 of the pipe 12 when the chamber 27 is pressurized. Here again, the inner edge 38 is preferably substantially in radial alignment with the radially extending wall 37. A valve fitting 39 is threaded into the rim 14 and is provided with a tubular extension which extends into the chamber 27 without requiring mechanical attachment with the chamber wall. It is through this fitting that air is admitted to or exhausted from the two chambers 26 and 27. The valve (not shown) in the fitting 39 can be of any suitable type which is capable of closing to maintain the pressure in the chambers 26 and 27 and which can be manually opened to allow exhausting of the chambers. A preferred valve is of the general type used in the valve stems of automotive tires or the like.

A gauging flange 42 is welded to the pipe 12 and is located so that it is substantially adjacent to one side of the body 13 when the two ends 22 and 24 of the pipes abut. The flange again can be continuous or can be formed of one or more lugs welded onto the pipe 12. Its function is to provide a visual indication of proper positioning of the pipe 12 with respect to the pipe 11 before inflation of the coupling.

The body 13 is preferably formed by extrusion. The extruded elastomeric material is preferably wrapped around a mandrel or the like before curing and is cured in such loop conditions so that it tends to retain the loop shape. The end faces of the extrusion are preferably bonded together to form the continuous closed loop required. The passage 28 may be cut into one or both ends of the member before the ends are bonded together.

The unstressed cross section of the elastomeric body 13 is preferably as illustrated in FIG. 3. In this condition the two walls 29 and 34 are concaved and have a radius greater than the maximum radius of the two flanges 19 and 23. Consequently, the pipe 12 can be freely inserted or removed from the coupling when the chambers are exhausted. When the two chambers 26 and 27 are pressurized the two walls 29 and 34 move radially inward until they tightly engage the adjacent pipe ends. This radial inward deflection of the wall 29 and 34 subjects the material of the walls to peripherally directed compressive stress. Therefore, the joint provided at the ends of the extruded body is not subjected to tensile stresses and there is substantially no tendency to rupture the body between the two end faces. With the illustrated structure the walls 29 and 34 assume the release condition even if a slight positive gauge pressure exists in the two chambers 26 and 27. The ribs 30 are provided to increase the amount of material subjected to compressive stress when the chambers are pressurized and to increase the tendency for the walls to return to the release position. Therefore, the walls move to the release position even if the two chambers are not completely exhausted. Reference should be made to our copending application, Ser. No. 8,278 filed Feb. 3, 1970, for a more complete discussion of a seal of this type. When the two chambers are pressurized, the walls tightly engage the adjacent pipe ends and provide a tight fluid seal along the cylindrical surfaces 31 and 36 and the engagement of the walls with the radially extending surfaces 32 and 37 provides resistance to axial separation of the pipe. The edges of the flanges 19 and 23 are rounded slightly to minimize any tendency to cut the body. It has been found in actual practice that a coupling of this type can be pressurized and left for extended periods of time without loss of any appreciable pressure. Therefore, a coupling in accordance with this invention can be used to couple two pipes or the like and does not need daily service.

Preferably, the center portion 44 between the two chambers 26 and 27 is solid so as to provide a substantial mass of material resisting any forces tending to separate the two pipes 11 and 12. Preferably, the inner wall 46 of the center portion 44 is formed with a sufficient clearance with respect to the two flanges 19 and 23 to permit free movement of the flanges into and out of the assembled condition. The outer wall portion 47 is substantially thicker than the flexible walls 29 and 34. The thick outer wall 47 in cooperation with the rim 14 prevents radial expansion of the body 13 under the influence of pressure in the chambers.

Assembly and connection of the pipes is accomplished easily when the coupling 10 is in the deflated condition of FIG. 3. In this condition the pipe 12 is freely moved into the coupling until the flange 42 is adjacent to the associated side of the body. This indicates that the two pipe ends are in abutting relation. After the pipe 12 is properly positioned within the coupling, the coupling is pressurized usually with air from any suitable source of pressure. In many instances a portable pressure bottle is used for this purpose. Pressurization is merely accomplished by connecting the pressure bottle to the fitting 39 to supply the air under pressure for inflation. After the coupling is inflated the bottle is removed and the air under pressure within the chambers 26 and 27 is retained by the valve in the fitting 39.

When it is desired to disconnect the two pipes, it is merely necessary to open the valve in the fitting 39 and exhaust the two chambers 26 and 27. When the chambers are exhausted the flexible walls 29 and 34 move back from the adjacent end and the pipe 12 can be freely separated. While the coupling is inflated, however, a fluid tight connection is provided and a mechanical connection is achieved which prevents any material relative movement between the two pipe ends. Those skilled in the art will recognize that with a coupling in accordance with this invention, substantially all of the labor required to connect and disconnect large piping is eliminated.

FIG. 4 illustrates a modified form of a coupling illustrated in FIGS. 1 through 3. In this embodiment, the coupling assembly 51 again includes a rim 52 similar to the rim 14 and a body 53 similar to the body 13. However, the rim 52 and body 53 are not permanently connected to either pipe. In this instance the two pipes 54 and 56 are both formed with similar locating flanges 57 and 58, respectively. Assembly in this embodiment is achieved by placing the coupling assembly 51 over the end of one or the other of the pipes until the end of the body engages one or the other of the flanges 57 or 58. The other pipe is then inserted until its flange engages the end of the body and the body is pressurized. With this embodiment a given coupling is not permanently affixed to a particular piece of pipe and can be used with any appropriate pair of pipes.

Figure 6:
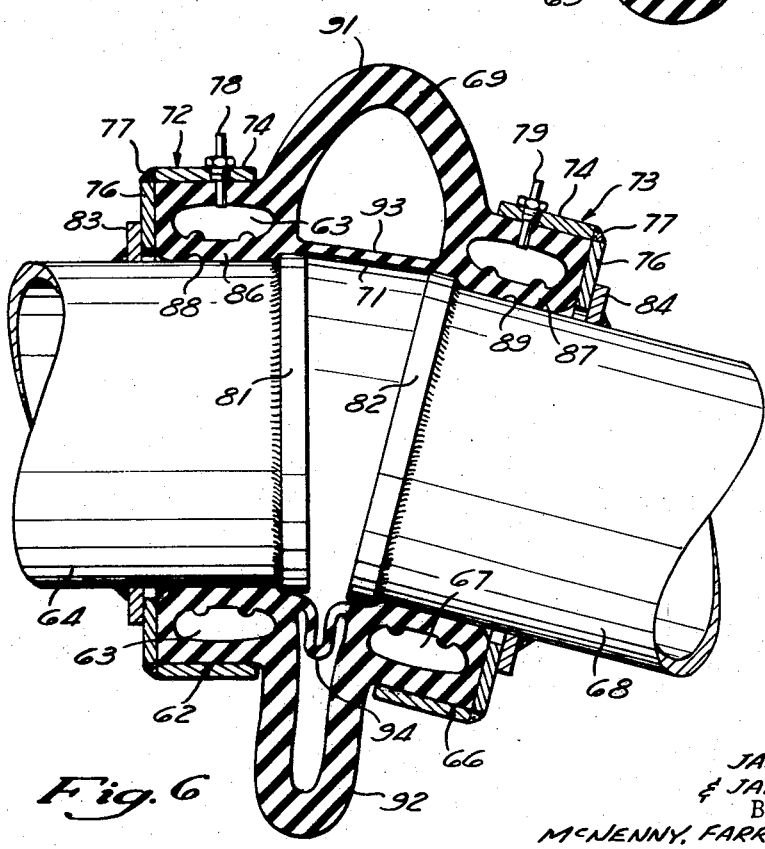
FIG. 6 is a fragmentary section similar to FIG. 5 illustrating the coupling after inflation and also after swiveling movement between adjacent pipes.

FIGS. 5 and 6 illustrate another embodiment of this invention in which the coupling is arranged to accommodate a degree of swiveling movement. In this embodiment the coupling again includes a continuous loop body 61 of elastomeric material. Here again, the body is preferably formed by extrusion and is of uniform cross section. The body 61 provides a first chamber section 62 formed with a continuous chamber 63 associated with a first pipe 64. The opposite side of the body is formed with a second chamber section 66 formed with a second continuous chamber 67 associated with a second pipe 68. The central portion of the body 61 between the two chamber sections 62 and 66 is formed with an annular spring portion 69 which is generally U-shaped in cross section. Connecting the inner legs of the U-shaped spring section and extending between the two chamber sections 62 and 66 is a relatively thin web portion 71.

A first rim assembly 72 is positioned around the first chamber section 62 and a second rim assembly 73 which is similar but opposite to the rim assembly 72 is positioned around the second chamber section 66. Each of the rim assemblies includes a cylindrical rim member 74 and an annular end portion 76 connected by a weld 77. The rim sections are again preferably formed of metal and provide radial, and in this instance, some axial confinement of the associated chamber section.

In this embodiment an internal connection is not provided between the two chambers 63 and 67 so valve fittings 78 and 79 are provided for pressurizing and exhausting the two chambers 63 and 67, respectively. The various elements are proportioned so that when the chambers 63 and 67 are exhausted as illustrated in FIG. 5, a flange 81 on the pipe 64 can freely pass into the coupling to the position illustrated in FIG. 5 and a flange 82 on the pipe 68 can similarly pass into the coupling to the assembled position. Locating shoulders 83 and 84 on the pipes 64 and 68 abut the end portions 76 when the ends of the pipe are properly positioned.

After the two pipe ends are assembled with the coupling as illustrated in FIG. 5, the chambers 63 and 57 are pressurized causing the flexible walls 86 and 87 to move radially inward from their unstressed condition of FIG. 5 to their operative position as illustrated in FIG. 6. This causes the walls to tightly engage the associated cylindrical portions 88 and 89 and the adjacent sides of the flanges 81 and 82. Such engagement provides a fluid tight joint between the body 61 and each of the pipe ends and also provides a mechanical connection which prevents the pipes from moving axially out of the coupling. A limited amount of relative axial movement can occur due to the flexibility of the web 71 and the spring section 69. The web 71, however, radially confines the fluid in the pipe and provides a bridging section between the two pipe ends.

If the swiveling movement is required between the two pipes, the spring section is deformed as illustrated in FIG. 6. In the particular condition illustrated, the upper section 91 extends or spreads and the lower section 92 axially compresses. Similarly, the upper portion 93 of the web is stretched to a straight condition while the lower section 94 of the web is collapsed or folded. Material used to form the body and, in turn, the web 71, is sufficiently elastic to permit the expected amount of swiveling movement without rupture.

Here again, coupling of the two pipes 64 and 68 is accomplished by merely positioning the two pipe ends within the coupling assembly while the two chambers 63 and 67 are exhausted to a pressure approaching atmospheric pressure. After the two pipes are properly positioned, the two chambers are pressurized to complete the coupling operation. When it is desired to disassemble the coupling, it is merely necessary to exhaust the two chambers and remove the two pipes. However because the body is formed with a flexible section between the two chamber sections, a substantial amount of swiveling movement can be accommodated without difficulty.

Couplings of the type illustrated in FIGS. 5 and 6 are particularly useful in piping systems which must accommodate substantial swiveling movement. For example, such couplings are useful in connecting the various sections of a dredge discharge pipe which may extend across the number of floats from the dredge to the desired location of discharge. Since movement between floats occurs, swiveling movement accommodated for by the coupling does not produce any problem.

Figure 7:
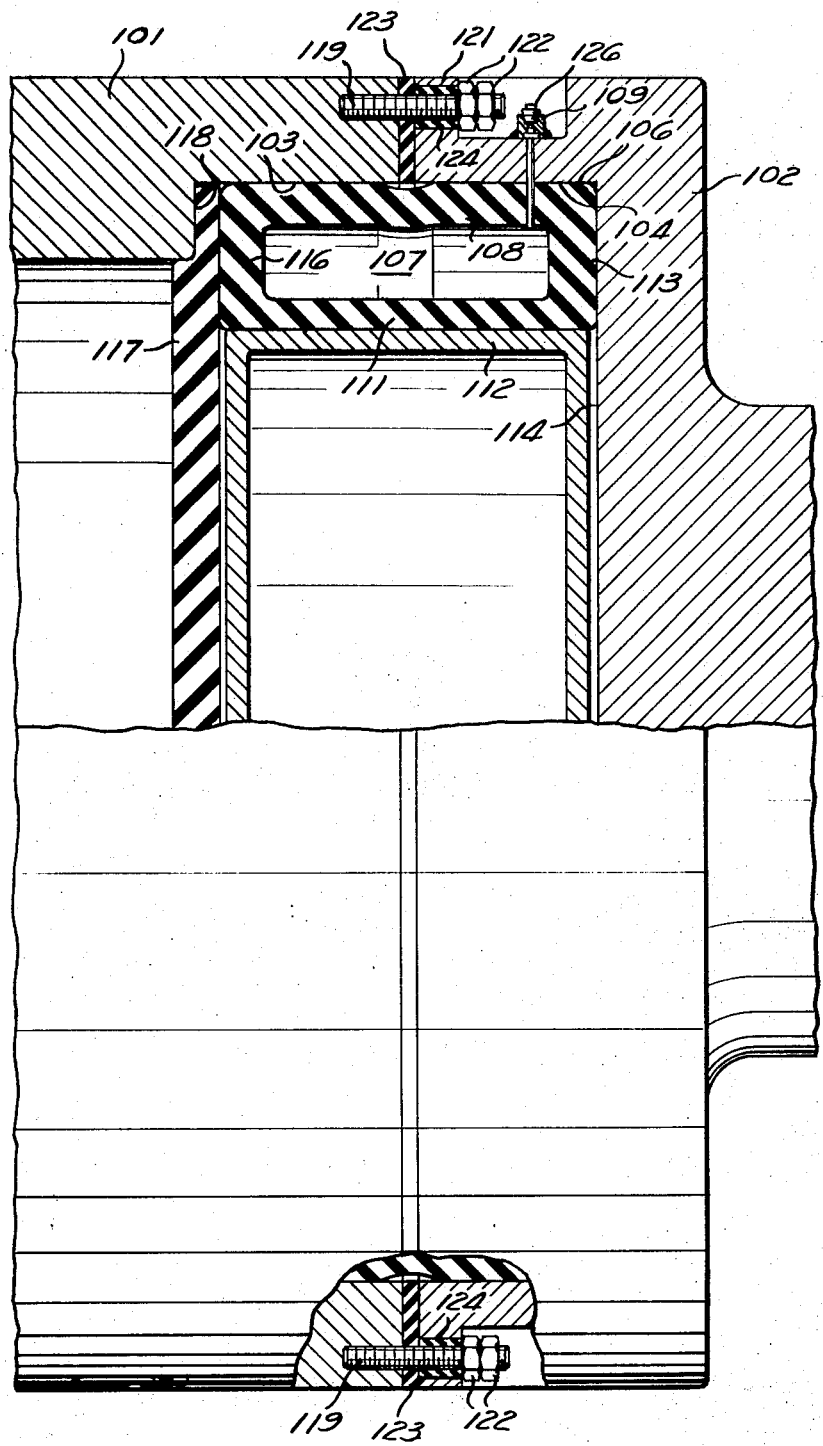
FIG. 7 is a longitudinal section of a torque transmitting coupling incorporating the present invention.

FIG. 7 illustrates still another embodiment of this invention. In this embodiment an internally positioned inflatable body provides a torque transmitting connection between two members. For example, such connection is useful in connecting a propeller of the type illustrated in our U.S. Letters Pat. No. 3,470,843 to the drive shafting of a ship. In such a structure, the tubular member 101 may be the torque tube portion of a propeller illustrated in our patent and the flanged member 102 is provided at the rearward end of the ship's drive shaft system adjacent to the propeller.

The tubular member 101 provides an internal cylindrical surface 103 having the same diameter as an internal cylindrical surface 104 formed in the member 102. Positioned within the two cylindrical surfaces 103 and 104 is a continuous loop inflatable member 106 again formed of elastomeric material. The body 106 is formed with a continuous chamber 107 which can be pressurized to cause the outer wall 108 to tightly engage the cylindrical walls 103 and 104 and provide a torque transmitting connection therebetween. A valved fitting 109 mounted on the member 102 is provided to permit pressurization and exhausting of the chamber 107. The inner wall 111 is radially supported by a rigid cylindrical member 112 formed of metal so that pressurization of the chamber 107 does not produce any radial contraction of the inner wall 111. Similarly one end wall 113 is axially confined by a radial wall 114 in the member 102 and the other end wall 116 is axially confined by a disc member 117 preferably formed of hard rubber-like material or metal as desired. The member 117 is axially supported by a radial wall 118 formed in the tubular member 111.

Any forces tending to cause axial separation between the members 101 and 102 is resisted by a ring of connectors which include studs 119 threaded into the member 101 extending through a flange 121 in the member 102. Nuts 122 on the studs 119 engage the backside of the flange 121 and prevent axial separation between the two members 101 and 102. Preferably a thrust member 123 is positioned between the adjacent end faces of the two members 101 and 102 and sleeves 124 formed of elastomeric material are positioned around the studs 119 within the flange 121. The sleeves 124 and thrust member 123 cooperate to permit a limited amount of relative movement between the two members 101 and 102 without excessively loading the studs. In this embodiment the principal torque connection between the two members is provided by the outer wall 108 and the sleeves accommodate sufficient relative movement to permit loading of the wall when torque must be transmitted between the two members. With this structure a torque driving connection is conveniently and easily provided inside of two cylindrical members so it is not necessary to provide radially extending flanges or the like which would increase the overall envelope of the structure for the torque transmitting connection. The various elements of the connection can be easily assembled without necessitating the use of an excessive number of heavy studs and after assembly. The simple operation of pressurizing a chamber completes the connection operation. Since this assembly is normally intended to provide a relatively permanent connection between the two members 101 and 102, a fitting 109 is provided with a plug 126 to positively prevent leakage. In installations in which the inflatable member is intended to serve as a clutch type connection the studs 119 structure is not used and thrust means are provided which prevent axial separation of the two members 101 and 102 while permitting relative rotation. In such a structure, pressurization of the chamber 107 results in a driving connection and relative rotation can occur when the chamber is exhausted.

Although preferred embodiments of this invention are illustrated, it is to be understood that various modifications and rearrangements of parts may be resorted to without departing from the scope of the invention disclosed and claimed.

What is claimed is:

1. An inflatable coupling comprising first and second unitary members having an end portion adapted to be positioned adjacent to each other, each end portion being formed with an integral radially extending flange at its end providing a radially extending surface on the side thereof opposite the associated end, a cylindrical surface extending axially from the associated radially extending surface in a direction away from the associated end, a coupling assembly including a closed loop gas-impervious body formed with continuous internal chamber means, conduit means for admitting fluid under pressure to and exhausting such fluid under pressure from said chamber means, said body providing generally cylindrical radially movable wall means, said wall means assuming a first position when the chamber is exhausted to substantially atmospheric pressure and moving toward a second position when said chamber means is pressurized, said wall means in said first position being free of any substantial contact with said cylindrical surfaces and said flanges, pressurization of said chamber means when said cylindrical surfaces are in face-to-face adjacency with said wall means causing said wall means to tightly engage each of said radially extending surfaces and the adjacent cylindrical surfaces extending therefrom to provide a fluid tight bridging connection between said members which limits relative movement therebetween, said coupling assembly providing rigid means along the side of said body opposite said wall means to radially confine the side of said body opposite said wall means, said bridging connection provided by said wall means being the sole connection between said members.

2. An inflatable coupling as set forth in claim 1, wherein said chamber means includes at least two separate closed loop internal chambers which are axially spaced from each other and said wall means includes axially separated moveable wall sections each of which is adapted to engage one of said cylindrical surfaces and adjacent radially extending surface when said chamber means are pressurized.

3. An inflatable coupling as set forth in claim 2, wherein said body provides a bridging portion between each wall section which is substantially free of movement in response to pressurization of said chamber means.

4. An inflatable coupling as set forth in claim 3, wherein said bridging portion is substantially rigid and prevents substantial movement between said members when said chambers means are inflated.

5. An inflatable coupling as set forth in claim 3 wherein said bridging means are sufficiently flexible to permit limited relative movement between said members when said chamber means are inflated.

6. An inflatable coupling as set forth in claim 5 wherein said bridging means includes a generally U-shaped portion which is sufficiently flexible to accommodate limited swiveling movement between said members.

7. An inflatable coupling as set forth in claim 6 wherein said rigid means includes separate rigid elements with one positioned opposite each wall section.

8. An inflatable coupling comprising first and second members each having an end portion providing a generally cylindrical surface adapted to be positioned adjacent to each other, a coupling assembly including a closed loop gas-impervious body formed with continuous internal chamber means, said body providing generally cylindrical radially movable wall means, said wall means assuming a first position when said chamber means is exhausted to substantially atmospheric pressure and moving toward a second position when said chamber means are pressurized, said wall means in said first position being free of any substantial contact with said cylindrical surfaces, pressurization of said chamber means when said cylindrical surfaces are in face-to-face adjacency with said wall means causing said wall mans to tightly engage both of said cylindrical surfaces and causing said body to provide a bridging connection between said members which limits relative movement therebetween, said coupling assembly providing rigid means along the side of said body opposite said wall means to radially confine said opposite side of said body, said wall means permitting substantially unrestricted movement of at least the end portion of one of said members into and out of face-to-face adjacency with said wall means when said wall means are in said first position, said one member being provided with a radially extending portion on the side of its cylindrical surface opposite the end of said one member abutting the adjacent end of said coupling assembly when the associated cylindrical surface is properly positioned in face-to-face adjacency with the associated wall means.

9. An inflatable coupling as set forth in claim 8 wherein said coupling assembly is mounted on the end of the other of said members.

10. An inflatable coupling as set forth in claim 8 wherein said coupling assembly is free of permanent connection with respect to both of said members, and each of said members is provided with a radial projection located adjacent the associated end of said coupling when their end portions are properly positioned in face-to-face adjacency with said wall means.

* * * * *